(12) United States Patent
Sommer

(10) Patent No.: US 6,691,016 B1
(45) Date of Patent: Feb. 10, 2004

(54) METHOD FOR REDUCING THE WHEEL SLIP OF A MOTOR VEHICLE

(75) Inventor: Norbert Sommer, Baienfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/129,904

(22) PCT Filed: Nov. 4, 2000

(86) PCT No.: PCT/EP00/10885
§ 371 (c)(1),
(2), (4) Date: May 22, 2002

(87) PCT Pub. No.: WO01/34445
PCT Pub. Date: May 17, 2001

(30) Foreign Application Priority Data

Nov. 11, 1999 (DE) .......................... 199 54 131

(51) Int. Cl.$^7$ .............................. B60T 8/00
(52) U.S. Cl. ............... 701/82; 701/88; 180/197
(58) Field of Search ............... 701/70, 72, 82, 701/83, 84, 85, 86, 87, 88, 89; 180/197

(56) References Cited

U.S. PATENT DOCUMENTS

| | | | | |
|---|---|---|---|---|
| 4,941,095 A | * | 7/1990 | Imaseki et al. ............... | 701/48 |
| 5,005,131 A | * | 4/1991 | Imaseki et al. ............... | 701/88 |
| 5,065,835 A | | 11/1991 | Richter et al. ............... | 180/197 |
| 5,407,023 A | | 4/1995 | Yamashita et al. ........... | 180/197 |
| 5,556,176 A | * | 9/1996 | Bosch et al. ................. | 303/165 |
| 5,564,800 A | * | 10/1996 | Fischle et al. ............... | 303/140 |
| 5,774,821 A | * | 6/1998 | Eckert .......................... | 701/78 |
| 6,219,609 B1 | * | 4/2001 | Matsuno et al. .............. | 701/72 |
| 6,301,548 B1 | | 10/2001 | Gerum ......................... | 702/158 |
| 6,442,469 B1 | * | 8/2002 | Matsuno ....................... | 701/70 |

FOREIGN PATENT DOCUMENTS

| | | |
|---|---|---|
| DE | 32 34 282 A1 | 3/1984 |
| DE | 38 40 004 C2 | 8/1992 |
| DE | 41 11 614 A1 | 10/1992 |
| DE | 44 03 160 A1 | 8/1994 |
| DE | 43 14 797 A1 | 11/1994 |
| DE | 196 49 137 A1 | 6/1997 |
| DE | 198 08 546 C1 | 10/1999 |
| EP | 0 911 234 A2 | 4/1999 |

* cited by examiner

Primary Examiner—Gary Chin
(74) Attorney, Agent, or Firm—Davis & Bujold, PLLC

(57) ABSTRACT

The invention concerns a method for reducing wheel slippage of a motor vehicle with at least one axle (2), on the ends of which steerable wheels (7, 8) are rotatingly placed, and with at least one axle (1, 2) on which wheels (5, 6, 7, 8) are driven by a differential drive (3, 4), whereby, in case of a wheel slip of one of the wheels of a driven axle (1, 2), a brake (16, 17) assigned thereto or a differential slip control is activated and controlled. In order that the traction and the driving stability of the motor vehicle are improved by a simple mechanism, the proposal is that the speeds of rotation of the wheels (5, 6, 7, 8) are determined, that from the speed of rotation of the wheels (6, 8) on the right vehicle side and of the wheels (5, 7) on the left vehicle side of an axle (1, 2), and from use of vehicle parameters, a virtual curve radius ($r_{virt}$) is computed, that the steering angle ($\alpha_a$, $\alpha_i$) of the steerable wheels (7, 8) of an axle (2) is computed, that a desired-radius ($r_{soll}$) is computed from an average steering angle $\alpha_m$ of the wheels (7, 8) or from a corresponding steering angle of a steering gear (14) by the use of vehicle parameters, that the virtual curve radius ($r_{virt}$) is compared with the desired radius ($r_{soll}$) and that the results for formation of a characteristic value serves to activate an assigned brake (16, 17) or to activate a differential slip control of a differential drive (3, 4).

5 Claims, 2 Drawing Sheets

METHOD FOR REDUCING THE WHEEL SLIP OF A MOTOR VEHICLE

Figure 1:
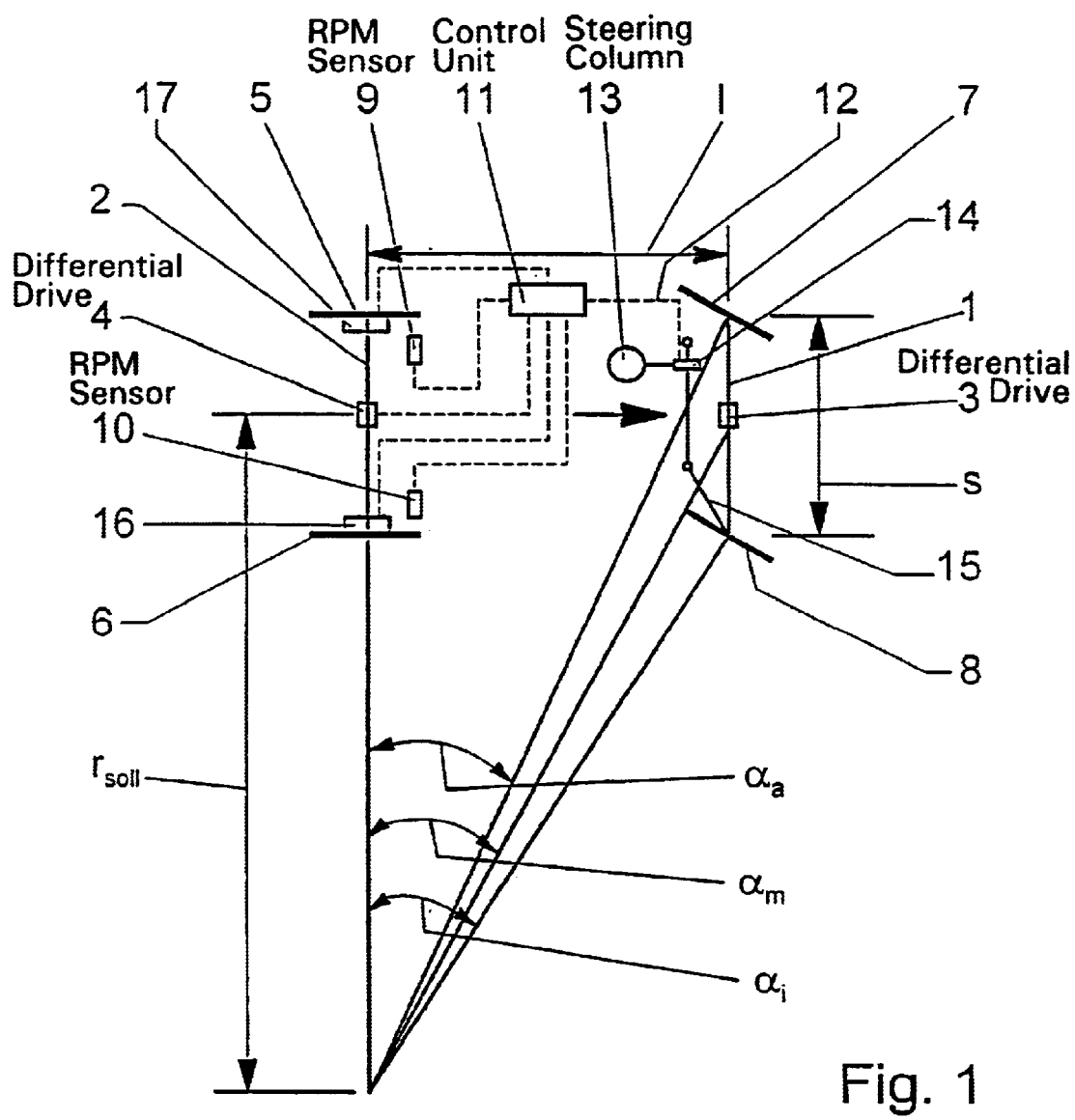

The invention relates to a method for reducing the wheel slip of a motor vehicle in accord with the generic concept of claim 1.

When motor vehicles drive through a curve, those wheels on the inside of the curve run on a smaller radius of curvature than do the wheels on the outside of said curve. Since the inside wheels travel, on that account, over a shorter distance than the outer wheels, their circumferential velocity and thereby their speed of rotation is correspondingly less. In order to enable this condition to take place, the wheels of a driven motor vehicle axle, with the exception of independent suspension drive vehicles, are powered through a differential drive. By this means, the wheels on one axle can roll over the road without wheel slip relative to the pavement. In this way, the driving force of the wheels of one axle support one another on the road. If a wheel should spin, then wheel slip is generated, relative to the road and the support torque correspondingly reduces itself to a torque which is a function of the friction load of the spinning wheel. The forward drive torque of the other wheel correspondingly lessens itself so that the traction of the motor vehicle is substantially reduced. Furthermore, because of the wheel slip, the lateral grip of a wheel and, in combination therewith, the stability of the motor vehicle is substantially impaired.

In order to improve the traction and also very frequently to carry out dynamic corrections in driving, differential drives with electronically limited slip-control find application. Further, the brakes in the individual wheels are specifically controlled in order to bring about a positive influence on the behavior of traction and stability of the vehicle.

Where the said regulations are concerned, the wheel slip serves as an control-input value. That is, if a wheel slipped so severely, that the differential slip control or a brake could lessen the slip, then the regulation would be activated. For this purpose, the wheel slip must be defined. In existing systems, the reference speed of the motor vehicle was determined in relation to the road.

By means of the reference speed, the desired speed, that is to say, the rotational speed of the wheels is computed and compared with the actual circumferential speed, i.e., speed of rotation of the wheels. The reference speed must be known as exactly as possible. The measurement or the computation of the vehicle reference velocity is very laborious and time consuming. In the case of 4-wheel drive vehicles, a special sensor must be used or the reference speed empirically estimated by means of various procedures.

Thus, the invention has the purpose to improve, with simple measures, the traction and travel stability of a motor vehicle without the necessity of knowing the reference speed of the motor vehicle. This purpose, in accord with the invention, is achieved by the features of claim 1.

In accord with the invention, the speeds of rotation of the wheels are determined. These are, in a first approximation, representative of the circumferential speed of the wheels since the speeds of rotation of the wheels, in general, stand in a linear relationship with the circumferential velocities. A virtual curve radius can be calculated from the speeds of rotation of the wheels on the right vehicle side of the axle and the wheels on the left vehicle side of the axle, by the use of geometric motor vehicle parameters, among these being especially the wheel gauge. The center of the axle would follow this virtual curve radius, if it were not coupled to the motor vehicle and if the wheels exhibited no slippage. Further, a desired radius is determined on the basis of vehicle parameters, especially giving consideration to the wheel base of the vehicle axles. The average steering angle of the wheels is found through the average value of the steering angle of the outside curve wheel and that of the inside curve wheel, both wheels being on the same axle. The midpoint of the axle would move itself on such a curve, if the wheels were rolling without slippage.

In an electronic control unit, which advantageously includes a microprocessor, the virtual curve radius is compared with the desired radius. If the wheels have no slip, then the desired radius and the virtual radius coincide throughout. From the result of this comparison of the virtual with the desired radius, a slip-related characteristic value is generated which serves the purpose of correspondingly activating and controlling an associated brake or differential slip control in the differential drive itself.

Advantageously, the said characteristic value incorporates the ratio, or else the difference of the desired radius to the virtual radius, which is indeed advantageous from the standpoint that the activation can only be brought about, when the desired radius is greater than the virtual radius. In other words, in this case, the ratio of desired radius to virtual radius is greater then one. To establish the characteristic value for the control of the differential slip control or, in some cases, control of a brake, it can be additionally advantageous to give consideration to the change of the result over time and/or the change of other parameters, these being yaw velocity, and/or transverse acceleration as well as the driving torque of the motor vehicle. In this way, the traction and the driving stability of a vehicle is brought into a balanced relationship.

In the Description and in the Claims, a multitude of features are presented and described in connection with one another. The expert can observe the combined features advantageously within the concept of a purpose to be achieved as well as in their individuality and be able to put them together in logical additional combinations.

Figure 2:
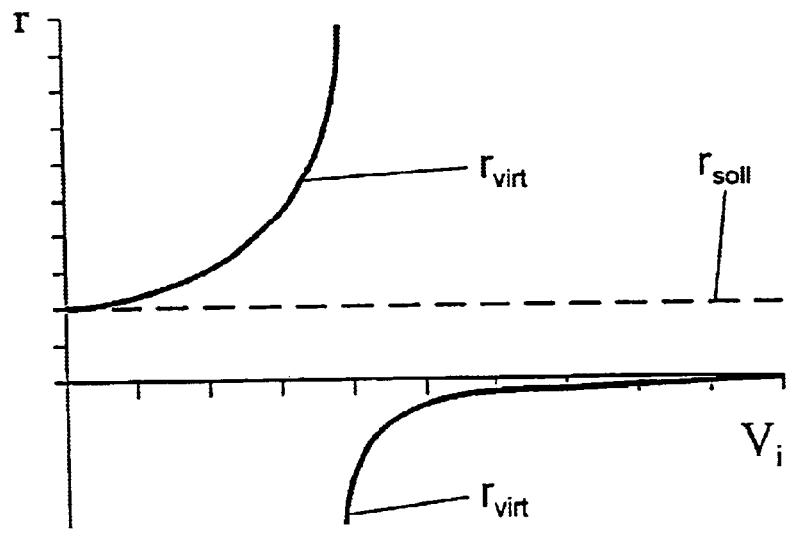
Figure 3:
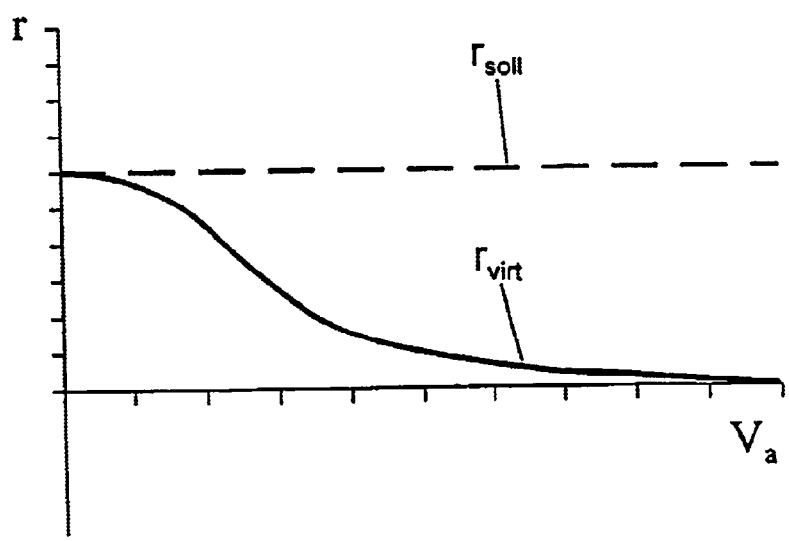

The attached drawing presents an embodiment example of the present invention. There is shown in:

FIG. 1 is a schematic presentation of the necessary components of a motor vehicle, which are required for the full explanation of the invented method, FIG. 2 is a curve of the virtual radius and a curve of the desired radius plotted against the circumferential speed of a wheel on the inside of the curve, and FIG. 3 is a curve of the virtual radius and a curve of the desired radius plotted against the circumferential speed of a wheel on the outside of the curve.

FIG. 1 shows a front axle 1 and a rear axle 2 of a motor vehicle which moves in the direction of the depicted arrow. The front axle carries on its ends, front wheels 7 and 8, while on the ends of the rear axle are provided the rear wheels 5 and 6. In the case of a 4-wheel drive motor vehicle, the wheels 5 and 6 are driven by a differential drive 4 on the rear axle 2 and the wheels 7 and 8 on the front axle are driven by a differential drive 3. If the vehicle has only one driven axle 1 or 2, then one of the differential drives 3 or 4 would be dispensed with. Electronically controllable differential slip controls are integrated in the differential drives 3, 4.

Brakes are placed on the wheels 5, 6, 7 of which, for the sake of clarity, only the brakes 16 and 17 on wheels 6 and 5 are illustrated.

The wheels 7 and 8 of the front axle are turned by a steering wheel 13, a steering gear 14 and a steering linkage 15, whereby the steering angle of the inner wheel 8 on the curve is designated by $\alpha_i$ and the steering angle of the outer wheel 7 on curve is shown as $\alpha_a$. With reference to the center of the front axle 1, an average angle of steering exists with reference number $\alpha_m$. There are vehicles in which more than one steerable axle 1 is possible.

The wheels 5 and 6, as well as 7 and 8, have the same gauge "s" whereby the front axle 1 possesses a wheel base l (small "L").

Speed of rotation sensors are provided of which only the speed of rotation sensors 9 and 10 on the rear axles are shown, in order that the speeds of rotation of the wheels 5, 6, 7, 8 may be calculated from their circumferential speeds. Further, the steering angles $\alpha_a$ and $\alpha_i$ are measured by means of a sensor which is not described here in detail. The said sensor can be integrated in the front axle 1 or in the steering gear 14. From the measured values along with the given vehicle parameters relating to the steering system, the average angle of steering $\alpha_m$ can be calculated.

The signals of the measured values are transmitted, over signal lines 12, to an electronic control unit which computes the virtual radius $r_{virt}$ from a circumferential velocity of the outside curve wheel $v_a$, that is, the corresponding speed of rotation and the circumferential speed of the inner curve wheel $v_i$ according to the expression:

$$r_{virt} = s/2 \cdot (v_a/v_i + 1)/(v_a/v_i - 1)$$

and is compared with the desired radius $r_{soll}$ according to $$r_{soll} = 1/\tan \alpha.$$

If the desired radius $r_{soll}$ is equal to the virtual curve radius $r_{virt}$, then the assumption may be made that no wheel slip exists. If the virtual curve radius $r_{virt}$ deviates from the desired radius $r_{soll}$, then the ratio of the desired radius $r_{soll}$ to the virtual curve radius $r_{virt}$, or the deviation itself can serve as a characteristic value for regulation of the differential slip control 3, 4, or for regulation of one of the brakes 16, 17, or can be processed with additional driving parameters to a corresponding characteristic value, or used for a fuzzy control.

FIG. 2 shows the curve of the virtual curve radius $r_{virt}$ as a solid line plotted against the speed $v_i$ of the inside curve wheel 6, 8, while the desired radius $r_{soll}$ is drawn in as a dashed line. Since the desired radius $r_{soll}$ is dependent only upon the steering angle, it is constantly independent of the circumferential speed $v_i$ of the inside curve wheel 6, 8. Otherwise, it relates itself to the virtual curve radius $r_{virt}$. If the circumferential speed $V_i$ of the inside curve wheel 6, 8, because of the wheel slip attains the circumferential speed $v_a$ of the outside curve wheel 5, 7, then the expression $(v_a/v_i - 1) = 0$ whereby the virtual radius $r_{virt} = 0$ and the virtual radius $r_{virt}$ tends toward infinity. FIG. 3 shows the curve for the virtual radius $r_{virt}$ plotted against the circumferential speed $v_a$ of the outside curve wheel 5, 7 when the outside curve wheel 5, 7 slips. Since, in this case, the circumferential speed $v_a$ of the outside curve wheel 5, 7 is always greater than the circumferential speed $v_i$ of the inside curve wheel 6 and 8, a continuous curve exists.

Reference Numbers and Parts

| 1 | front axle | 15 | steering linkage |
|---|---|---|---|
| 2 | rear axle | 16 | brake |
| 3 | differential drive | 17 | brake |
| 4 | differential drive | l | wheel base |
| 5 | rear wheel outside | s | wheel gauge |
| 6 | rear wheel inside | $\alpha_a$ | steer angle outside |
| 7 | front wheel outside | $\alpha_i$ | steer angle inside |
| 8 | front wheel inside | $\alpha_m$ | average steer angle |
| 9 | RPM sensors | $V_a$ | circum. Speed |
| 10 | RPM sensors | Vi | circum. Speed |
| 11 | control unit | r | radius |
| 12 | signal lines | $r_{soil}$ | desired radius |
| 13 | steering column | $r_{virt}$ | virtual radius |
| 14 | steering gear | | |

What is claimed is:

1. A method for reducing wheel slippage of a motor vehicle having at least one axle (2) on which steerable wheels (7, 8) are rotatingly mounted and having at least one axle (1, 2) with wheels (5, 6, 7, 8) which are driven by a differential drive (3, 4) whereby, in case of wheel slip of one of the wheels of a driven axle (1, 2) one of a brake (16, 17) assigned thereto and a differential slip control is activated and controlled, the method comprising the steps of:

determining a rotational speed of the wheels (5, 6, 7, 8);

computing from use of vehicle parameters and from the rotational speed of the wheels (6, 8) on a right vehicle side of an axle and from the rotational speed of the wheels (5, 7) on a left vehicle side of an axle (1, 2), a virtual curve radius ($r_{virt}$);

computing a steering angle ($\alpha_a$, $\alpha_i$) of the steerable wheels (7, 8) of the at least one axle (2);

computing a desired radius ($r_{soll}$) from one of an average steering angle $\alpha_m$ of the wheels (7, 8) and from a corresponding steering angle of a steering gear (14) by the use of the vehicle parameters;

comparing the virtual curve radius ($r_{virt}$) with the desired radius ($r_{soll}$); and using a result of the comparison for forming a characteristic value which serves for one of activating the assigned brake (16, 17) and activating the differential slip control of the differential drive (3, 4).

2. The method according to claim 1, further comprising the step of providing the characteristic value with one of a ratio of the desired radius ($r_{soll}$) to the virtual curve radius ($r_{virt}$) and a difference of the desired radius ($r_{soll}$) to the virtual curve radius ($r_{virt}$).

3. The method according to claim 2, further comprising the step of activating one of the assigned brake (16, 17) and the differential slip control when the ratio of the desired radius ($r_{soll}$) to the virtual radius ($r_{virt}$) is greater than one.

4. The method according to claim 1, further comprising the step of giving consideration of the characteristic value to changes of the result over one of a duration of time and to further driving parameters.

5. The method according to claim 4, further comprising the step of using at least one of a yaw velocity and a transverse acceleration of the vehicle as a driving parameter.

* * * * *